(12) United States Patent
Palm

(10) Patent No.: US 8,069,265 B2
(45) Date of Patent: Nov. 29, 2011

(54) METHOD AND SYSTEM FOR NETWORK ROTAMETER STATION AND SERVICE

(75) Inventor: Stephen R. Palm, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 1330 days.

(21) Appl. No.: 11/325,046

(22) Filed: Jan. 4, 2006

(65) Prior Publication Data

US 2006/0153080 A1    Jul. 13, 2006

Related U.S. Application Data

(60) Provisional application No. 60/642,745, filed on Jan. 10, 2005.

(51) Int. Cl.
*G06F 15/173* (2006.01)

(52) U.S. Cl. ........ 709/239; 709/224; 709/235; 709/238; 370/229; 370/237

(58) Field of Classification Search .......... 709/223–226, 709/231–232, 238–242, 235; 370/229–235, 370/237
See application file for complete search history.

(56) References Cited

U.S. PATENT DOCUMENTS

| | | | | |
|---|---|---|---|---|
| 4,156,109 A | * | 5/1979 | Kraushaar et al. | 379/137 |
| 5,548,724 A | * | 8/1996 | Akizawa et al. | 718/105 |
| 5,742,587 A | * | 4/1998 | Zornig et al. | 709/234 |
| 6,381,228 B1 | * | 4/2002 | Prieto et al. | 370/323 |
| 6,452,935 B1 | * | 9/2002 | Gibbs | 370/439 |
| 6,678,740 B1 | * | 1/2004 | Rakib et al. | 709/247 |
| 6,701,356 B1 | * | 3/2004 | Condict et al. | 709/223 |
| 6,850,989 B1 | * | 2/2005 | Lavian et al. | 709/242 |
| 7,013,333 B1 | * | 3/2006 | Skells | 709/223 |
| 7,065,482 B2 | * | 6/2006 | Shorey et al. | 709/224 |
| 7,065,573 B2 | * | 6/2006 | Byrnes | 709/224 |
| 7,149,189 B2 | * | 12/2006 | Huntington et al. | 370/235 |
| 7,430,591 B2 | * | 9/2008 | Chamberlain | 709/224 |
| 7,444,404 B2 | * | 10/2008 | Wetherall et al. | 709/224 |
| 2001/0043585 A1 | | 11/2001 | Hummel | |
| 2002/0103921 A1 | * | 8/2002 | Nair et al. | 709/238 |

FOREIGN PATENT DOCUMENTS

EP    0465090 A    1/1992

* cited by examiner

*Primary Examiner* — Bharat Barot
(74) *Attorney, Agent, or Firm* — McAndrews, Held & Malloy, Ltd.

(57) ABSTRACT

Methods and systems for controlling network traffic in a network are disclosed herein and may include monitoring network traffic characteristics for a plurality of communication channels in a home network, by at least one processor within the home network. The at least one processor may re-route network traffic for at least a portion of the plurality of communication channels in the home network, based on analysis by the at least one processor of at least the monitored network traffic characteristics. Network traffic can be estimated for at least a portion of the plurality of communication channels in the home network by the at least one processor within the home network, based on the monitored network traffic characteristics. The at least one processor may re-route network traffic for a portion of the plurality of communication channels in the home network, based on the estimated network traffic.

44 Claims, 6 Drawing Sheets

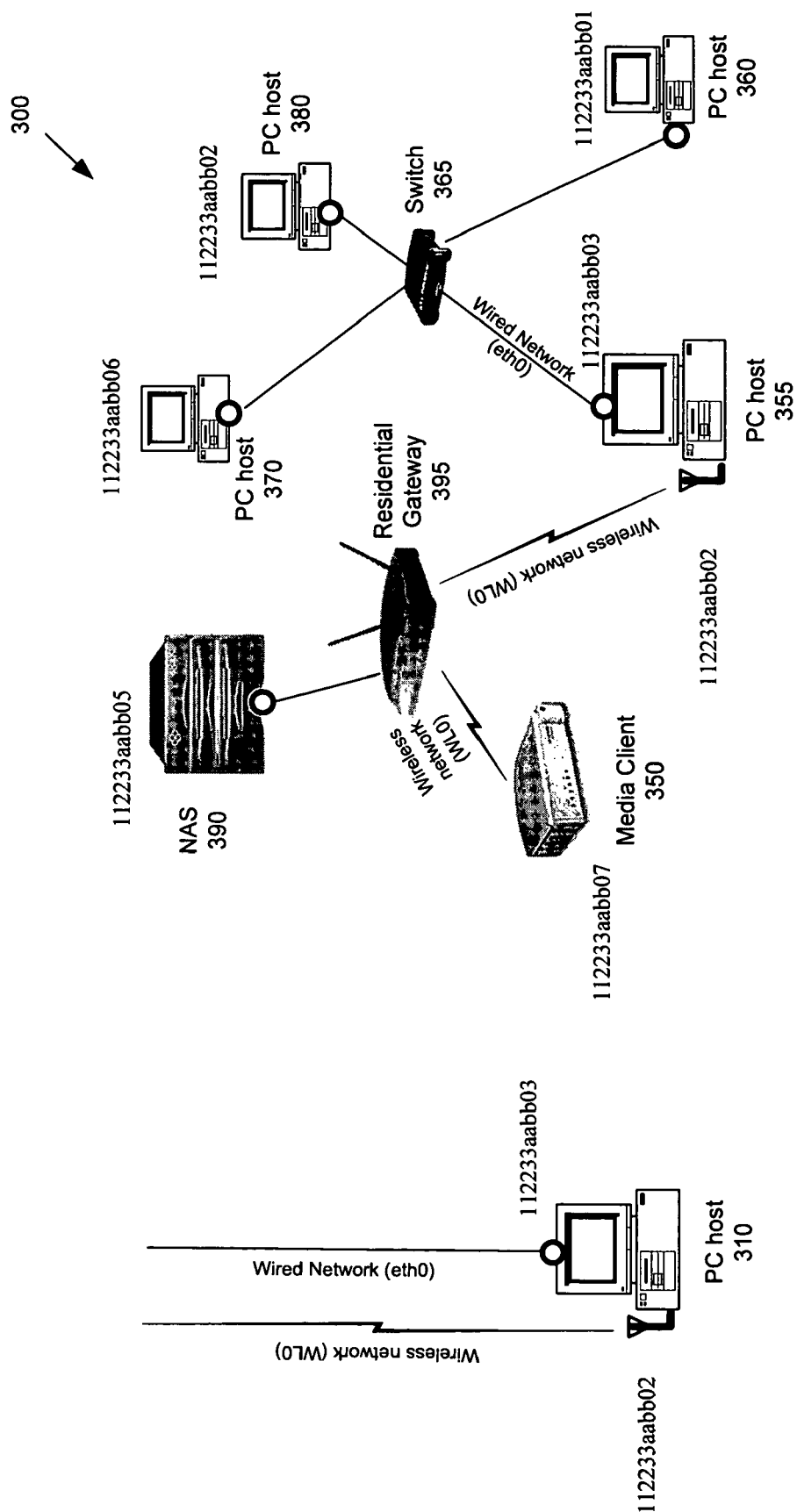

METHOD AND SYSTEM FOR NETWORK ROTAMETER STATION AND SERVICE

CROSS-REFERENCE TO RELATED APPLICATIONS/INCORPORATION BY REFERENCE

This application makes reference to, claims priority to, and claims the benefit of U.S. Provisional Application Ser. No. 60/642,745 filed Jan. 10, 2005.

The above stated application is incorporated herein by reference in its entirety.

FIELD OF THE INVENTION

Certain embodiments of the invention relate to management of communication networks. More specifically, certain embodiments of the invention relate to a method and system for network rotameter station and service.

BACKGROUND OF THE INVENTION

As digital media has become more popular, there has been much interest in using home networking technology to distribute the digital media among devices in the home. The digital media can be stored and played in many locations. Additionally, there may be many sources of the digital media such as multiple users in the home, content providers, and service providers. The demand for transferring digital media files may exceed the available bandwidth or latency constraints of the home network or portions of the home network. Excess demand may cause delivery delay. Since delivery of some of digital media files is time sensitive, delivery delay leads to rendering errors and artifacts that are annoying to users.

In the past, it has been proposed that reservation or allocation systems be used to avoid over-demand of the network links. This is based on the premise that the entire system of user applications and digital media files can be completely controlled. Unfortunately, reservation systems have fundamental flaws including requiring all users and applications to accurately know what amount of network resources they will need a priori, and requiring that all applications participate in the reservation system so that accurate allocation and calculations can be performed. These limitations are burdensome and have discouraged practical implementations.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method for network rotameter station and service, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

Other systems, methods and features of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF SEVERAL VIEWS OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 3a shows an example of an implementation of a network device comprising a personal computer (PC) host having a wireless network interface and a wired network interface.

FIG. 3b shows an example of an implementation of a communication network comprising a Ethernet switch.

DETAILED DESCRIPTION OF THE INVENTION

Aspects of the present invention relate to the management of communication networks, and more specifically to the monitoring of network traffic, so as to report information to users and applications about current conditions and facilitate predictions about future network flow conditions. Since complex heterogeneous communication systems may not be totally controllable a priori, in one example of an implementation of the invention, current network activity can be monitored, and network activity can be predicted based on the monitored current network activity. Network communication traffic can then be selected or re-routed based on the predicted network activity.

While the invention is described in terms of a realizable communication network in a home, the invention is not so limited and it can be applied to networks of any size and scale. In addition, although the present invention describes the use of a universal plug-and-play (UPnP) service in accordance with a UPnP device architecture, other protocols and messaging methods can be also employed without departing from the spirit and scope of the invention.

Figure 1:
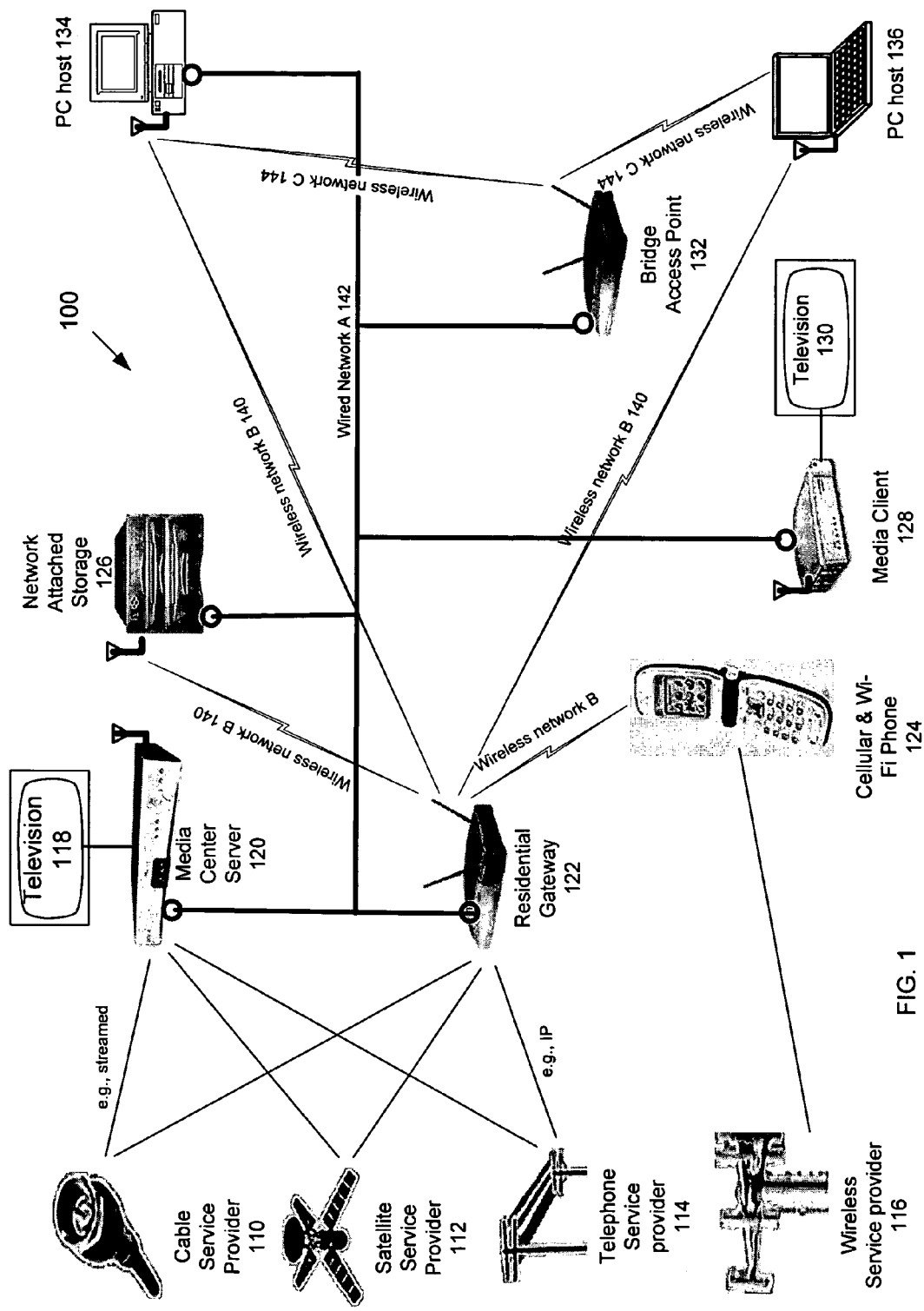
FIG. 1 shows an example of an implementation of a communication network comprising wired and wireless networking technology.

FIG. 1 shows an example of an implementation of a communication network comprising wired and wireless networking technology. Referring to FIG. 1, the communication network 100 includes a wired network A 142 communicatively coupling a media center server 120, a residential gateway 122, a network attached storage (NAS) 126, a media client 128, a bridge access point 132, and a personal computer (PC) host 134. The media center server 120 and the media client 128 are communicatively coupled to televisions 118 and 130, respectively. The communication network 100 also includes a cellular/Wi-Fi phone 124, and a personal computer (PC) host 136. The communication network 100 may also include service providers, such as a cable service provider 110, a satellite service provider 112, a telephone service provider 114, or a wireless service provider 116. The PC host 136 may be, for example, a laptop computer.

The residential gateway 122 is wirelessly coupled to the NAS 126, the PC host 134, the PC host 136, and the cellular/Wi-Fi phone 124 via the wireless network B 140. In addition to communicating via the wireless network B 140, the residential gateway 122 can communicate with the NAS 126, the media center server 120, the media client 128, the bridge access point 132, and the PC host 134 via the wired network A 142. The PC host 134 and the PC host 136 can communicate with any of the devices in communication with the wired network A 142, via the bridge access point 132 that supports the wireless network C 144. The media center server 120 and the media client 128 can utilize antennas to allow reception of programs broadcast over the air using the commercial broadcast spectrum, or via other services such as, for example, local microwave distribution service (LMDS). The cellular/Wi-Fi phone 124 may include, for example, a mobile multimedia handset capable of using a number of different media formats, such as streaming video, broadcast video, digitized voice, digital data, text, digitized audio, digitized still images, digitized video, and/or digitized music.

The wired network A 142 may be, for example, an Ethernet network (e.g., Institute of Electrical and Electronics Engineers, Inc. (IEEE) 802.3 compliant network), or a network that re-uses existing wires within the residence, such as HomePNA (as specified by the Home Phoneline Networking Alliance), HomePNA over Coax, HomePlug (as specified by the HomePlug Powerline Alliance), various forms of Ethernet over Coax, Residential Ethernet, or IEEE 802.11 over coaxial cable, for example. The wireless technologies employed in wireless network B 140 and the wireless network C 144 may be, for example, IEEE 802.11a/b/g/n, IEEE 802.15, IEEE 802.16, and/or Bluetooth and any of their variants. In this regard, wireless technologies such as IEEE 802.11a/b/g/n allow multiple access points, interconnected by wired and/or wireless links to extend range or coverage. Additionally, wireless technologies may use multiple frequencies, antennas or channels, which effectively create multiple network segments, which can increase capacity or reduce interference.

Referring again to FIG. 1, one or more devices within the network 100 can communicate with more than one communication network. For example, the wired network A 142, the wireless network B 140 and the wireless network C 144 each support several devices that can have connections to other communications networks. The wireless network B 140 and the wireless network C 144 can use the same wireless technology, but they can also use separate radio frequency channels, so that there can be effectively twice as much bandwidth.

In one example of an implementation of the invention, one or more devices within the communication network 100 can be configured as Network Rotameter Observation (NRO) stations and/or Network Rotameter Analysis (NRA) stations. A NRO station collects one or more network communication parameters related to network traffic between devices within the network 100. A NRA station can be adapted to analyze communication parameters collected by a NRO station, for example, and generate a prediction for one or more network traffic parameters. Traffic within the network 100 can then be re-routed based on the information from a NRO station or the prediction generated by the NRA station.

Figure 2:
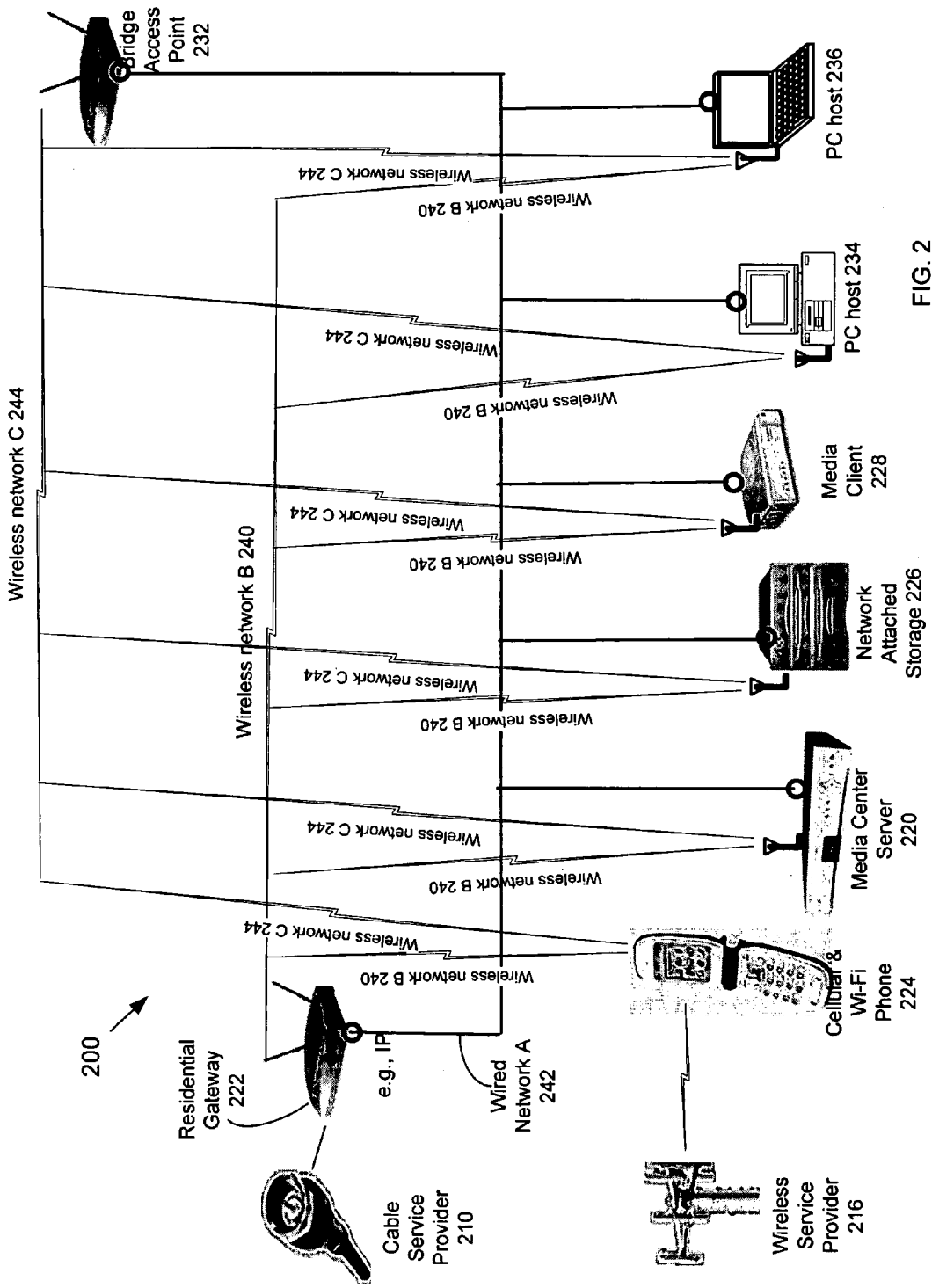
FIG. 2 illustrates a communication network that is a logical reorganization of the communication network 100 of FIG. 1, as example of an implementation, illustrating a plurality of buses on which data can flow.

FIG. 2 illustrates a communication network that is a logical reorganization of the communication network 100 of FIG. 1, for example, illustrating a plurality of buses on which data flows, in accordance with an example of an implementation of the invention. The network illustrated in FIG. 2 has been rearranged to illustrate the common communication buses of the communication network 100 of FIG. 1 more clearly. Referring to FIG. 2, the communication network 200 includes a wired network A 242 communicatively coupling a media center server 220, a residential gateway 222, a network attached storage (NAS) 226, a media client 228, a bridge access point 232, and personal computer (PC) hosts 234 and 236. The communication network 200 may also include a cable service provider 210, a wireless service provider 216, or a cellular/Wi-Fi phone 224. The PC host 236 can be, for example, a laptop computer.

The residential gateway 222 is wirelessly coupled to the NAS 226, the PC host 234, the PC host 236, the media client 228, the media center server 220, and the cellular/Wi-Fi phone 224 via the wireless network B 240. In addition to communicating via the wireless network B 240, the residential gateway 222 can communicate with the NAS 226, the media center server 220, the media client 228, the bridge access point 232, and the PC host 234 via the wired network A 242. The PC host 234 and the PC host 236 can communicate with any of the devices in communication with the wired network A 242, via the bridge access point 232, which supports the wireless network C 244.

In accordance with an example of an implementation of the invention, the network 200 may include a plurality of network weather monitoring (observation) stations distributed throughout the communication network 200, and network weather analysis stations also distributed throughout the network 200. The network weather monitoring stations are referred to herein as network rotameter observatories (NRO) or network rotameter observation (NRO) stations, and each NRO can be an entity contained within or separate from any of the devices in a communication network such as, for example, the devices of the communication network 200 of FIG. 2. The network weather analysis stations are referred to herein as network rotameter analysis (NRA) stations, and in a similar fashion, an NRA can be an entity contained within or located separate from any of the devices in a communication network such as, for example, the communication network 200 of FIG. 2. Both the network rotameter observatories (NRO) and the network rotameter analysis (NRA) stations can provide on-network portals of information (e.g., from an NRO station) and/or predictions of network traffic at points between observation stations (e.g., from an NRA station).

The network rotameter observations performed by NRO stations, for example, can relate to network traffic on any of the buses utilized by the wireless network C 244, the wireless network B 240, and/or the wired network A 242. This allows the amount of traffic on each bus within the network 200 to be determined, thus permitting applications to select on which bus their traffic is to occur.

In a example of an implementation of the present invention, a network rotameter observatory (NRO) can monitor a plurality of parameters that may be per link or described in terms of neighbors. For example, an NRO can monitor the following parameters in the network 200: device identification such as IP address or MAC address, shared versus switched media link indication, reporting bits (in bits), reporting period (in seconds), time of last reading, monitoring resolution, IEEE 802.11 channel information, and Traffic Class identification.

The "per link" information and "described in terms of neighbors" information can correspond to the number of links, or neighbors, which are connected to the NRO station. The device identification parameter identifies a device via an internet protocol (IP) address or a media access control (MAC) address. The "shared versus switched media" link indication indicates whether a particular device is a device for switched medium, such as 10BaseT Ethernet, or a device for shared medium such as 802.11 wireless. The "reporting bits" parameter indicates the number of bits that have been transmitted or received between a NRO station and a neighboring device. The "reporting period" parameter indicates the time duration of the reporting period for the reporting bits. In this regard, the rate of exchange of information between a NRO and a neighboring device can be calculated by utilizing the "reporting bits" and "reporting period" parameters.

The "time of last reading" parameter indicates the time the last observation was performed. The "monitoring resolution" parameter indicates the frequency of the observations performed by the NRO station. The "IEEE 802.11 channel information" indicates the channel used for network traffic that is currently observed by a NRO. The "Traffic Class indication" parameter indicates a traffic class in accordance with the UPnP Quality of Service (QoS) architecture or IEEE 802.1D.

A network rotameter observatory (NRO) can further support a plurality of requests for action from network entities within the network 200. For example, action requests RequestRotameterObservation and ConfigureRotameterObservation can be employed by a NRO. The RequestRotameterObservation action request utilizes the number of descriptions per address as a setting, and the ConfigureRotameterObservation action request utilizes the reporting period (duration of observation in seconds) and the monitoring resolution as settings. The monitoring resolution can indicate how often measurements are to be taken, for example, every x seconds.

Output of network observations from a NRO can be generated in a variety of circumstances. For example, output timing can be on-demand, when needed by another network device, or it can be as a collection of periodic reports, where multiple prior reports are provided in response to one request. Reporting by a NRO can also be event based, and any station can have the reports for the communication network, either periodically, or on demand.

In one example of an implementation of the invention, one or more network rotameter analysis (NRA) stations can be utilized to analyze observations obtained by a NRO station. The network rotameter analysis (NRA) station can generate a number of forms of network traffic information. For example, a NRA station can generate a network rotameter (Flow/Weather) map, time of day traffic information, and/or segment traffic information. Furthermore, the information provided by the NRA station can be ordered by severity, or it can be ordered by proximity of the requester, for example, concerns closest to your neighborhood. The network rotameter observatory (NRO) station can share information with the network rotameter analysis (NRA) station. In this regard, the NRO station can collaborate with the NRA station on report generation, and the reports of other stations can be verified.

Software applications located on devices having access to a communication network such as the communication network 200 of FIG. 2, can receive information from network rotameter services of either network rotameter analysis (NRA) stations or network rotameter observatory (NRO) stations. Such software applications can use one or more techniques for managing the communication network. Some sample example techniques include: storm warning events, Internet control message protocol (ICMP) quench, modification of routing tables, suggestion of alternate (uncrowded) routes, and/or modification of NAV to reset TCP windows. Such software applications may provide information to and/or request information from one or more users. One or more users may perform actions, perhaps out-of-band, such as, for example, turning a device off, reconfiguring a device, reconfiguring an application, selecting a different stream resolution, upgrading a device, or replacing a device in response to the provided information.

A storm warning event can be an event which is broadcast by a NRA station and/or a NRO station and can indicate increased current network traffic, or increased future network traffic. An ICMP source quench message is intended as a congestion control mechanism in IP. Source quench messages are used when a network device should reduce the amount of traffic it is sending. The network device can transmit a source quench message back to a network device to request that the network device reduce its transmission rate until it no longer receives source quench messages from the network device. Thus, this mechanism effectively throttles back the network data transmission rate within the network 200.

In another example of an implementation of the invention, a network rotameter observatory (NRO) station within the network 200 may include one or more structures implemented in extensible markup language (XML). For example, a NRO station includes a neighbor information (NeighborInformation, sometimes also referred to as RotameterInformation) structure that provides MAC address information about devices reachable through each active interface. The NeighborInformation structure may include the following information fields or elements: LinkReachableMacs, LinkId, MacAddress, ReachableMac, BridgedId, RotameterObservation, RotameterIndex, ROAddr, ROBits, ROPeriod, ReportingDateTime, and/or MonitorResolutionPeriod. LinkReachableMacs is an information element that is used for each available link supported by the device. LinkId is an information element that is of type string, and is unique within the device. The LinkID information element can identify a layer-2 link, for example.

MacAddress is an information element, that is used whenever it is available. The MacAddress information element provides the media access control (MAC) address of the interface for an end point device. ReachableMac is an information element that is used to provide the MAC address(es) of end point devices that are reachable through a link, if any exist. In some environments, this information element may be obtained using a command of the form "arp-a." BridgedId is an information element that can identify links that are bridged together. Links that have the same BridgeID can be interconnected within the device such that layer-2 frames are forwarded between them. RotameterObservation is an information element that can be present, and includes a sequence of elements describing a network rotameter observation. RotameterIndex is an information element that includes an index that is incremented and is unique per observation of the reporting device.

ROAddr is an information element that includes an address of the device of a report. If the ROAddr is present and is the same address as the reporting device interface, then the rotameter observation can be for traffic to/from that reporting device. If the ROAddr is present and is different than the reporting device, then the rotameter observation can be for traffic between the address and the reporting device. ROBits is an information element that can be present and indicates the number of bits in an observation period. ROPeriod is an information element that can be present and indicates the duration of an observation period. ReportingDateTime is an information element that can be present, and indicates the time of completion of an observation period. MonitorResolutionPeriod is an information element that can be present and indicates how often a rotameter observation is initiated.

Although specific names have been provided for each of the fields or information elements described above, the present invention can not be so limited and other combinations of fields or information elements can be employed, having other names and structures, without departing from the spirit and scope of the invention.

An example of an implementation of the present invention can employ an extensible markup language (XML) schema definition for a NeighborInformation structure, such as the example shown in Listing 1:

Listing 1.

```
<xs:schema xmlns:xs="http://www.w3.org/2001/XMLSchema"
  xmlns="http://www.broadcom.com/schemas/NeighborInformation.xsd"
targetNamespace="http://www.broadcom.com/schemas/NeighborInformation.xsd"
  elementFormDefault="qualified">
  <xs:annotation>
    <xs:documentation xml:lang="en">
      QosRotameter NeighborInformation schema.
    </xs:documentation>
  </xs:annotation>
  <xs:element name="DeviceReachableMacs">
  <xs:complexType>
    <xs:sequence>
      <xs:element name="LinkReachableMacs" >
        <xs:complexType>
          <xs:sequence>
            <xs:element name="LinkId" type="xs:string" />
            <xs:element name="BridgeId" type="xs:string" />
            <xs:element name="MacAddress" type="MacAddressType" />
            <xs:element name="ReachableMac" type="MacAddressType" />
            <xs:complexType="RotameterObservation">
              <xs:sequence>
                <xs:element name="RotameterIndex" type="xs:integer" />
                <xs:element name="ROAddr" type="MacAddressType" /> (or IP
address)
                <xs:element name="ROBits" type="xs:integer" />
                <xs:element name="ROPeriod" type="xs:integer" /> (seconds)
                <xs:element name="ReportingDateTime" type="xs:string" />
                <xs:element name="MonitorResolutionPeriod" type="xs:integer"
/> (seconds)
                <xs:any />
              </xs:sequence>
            </xs:complexType>
            <xs:any />
          </xs:sequence>
        </xs:complexType>
      </xs:element>
      <xs:any minOccurs="0" maxOccurs="unbounded" />
    </xs:sequence>
  </xs:complexType>
  </xs:element>
</xs:schema>
```

FIG. 3a shows an example of an implementation of a network device comprising a personal computer (PC) host having a wireless network interface and a wired network interface. Referring to FIG. 3a, the wireless network interface of the PC host 310 has an example MAC address 112233aabb02 to a wireless network labeled WL0. The wired network interface of the PC host 310 of FIG. 3a has an example MAC address 112233aabb03 to a wired network labeled eth0. In one example of an implementation of the invention, the PC host 310 can act as either or both of a network rotameter observatory (NRO) station and a network rotameter analysis (NRA) station.

In another example of an implementation of the invention, an argument XML string can be employed to describe an end point network device having two network interfaces such as, for example, the PC host 310 of FIG. 3a. The example of an implementation of an argument XML string shown in Listing 2, below, can correspond to, for example, an argument XML string suitable for the PC host 310. In the example of an implementation of an argument XML string of Listing 2, the two network interfaces of the network device are not currently making rotameter observations.

Listing 2

```
<DeviceReachableMacs
  xmlns="http://www.broadcom.com/schemas/QosRotameter.xsd">
```

-continued

Listing 2

```
  <LinkReachableMacs>
    <LinkId>eth0</LinkId>
    <MacAddress>112233aabb03</MacAddress>
  </LinkReachableMacs>
  <LinkReachableMacs>
    <LinkId>WL0</LinkId>
    <MacAddress>112233aabb02</MacAddress>
  </LinkReachableMacs>
</DeviceReachableMacs>
```

An example of an implementation of the present invention can employ an argument XML string for a network device such as, for example, a PC with two network interfaces. The example shown in Listing 3, below, is similar to the previous example, and is representative of an end point network device with two network interfaces such as the PC host 310 in FIG. 3a. In the example argument XML string of Listing 3, the network interfaces are actively connected and actively making rotameter observations.

Listing 3.

```
<DeviceReachableMacs
    xmlns="http://www.broadcom.com/schemas/QosRotameter.xsd">
    <LinkReachableMacs>
        <LinkId>eth0</LinkId>
        <MacAddress>112233aabb03</MacAddress>
        <RotameterObservation>
            <RotameterIndex>10000001</RotameterIndex>
            <ROAddr>112233aabb03</ROAddr>
            <ROBits>1000000</ROBits>
            <ROPeriod>1</ROPeriod>
            <ReportingDateTime>20041126 15:03:23.45</ReportingDateTime>
            <MonitorResolutionPeriod>60</MonitorResolutionPeriod>
        </RotameterObservation>
        <RotameterObservation> ... </RotameterObservation>
        <ReachableMac>112233aabb06</ReachableMac>
        <RotameterObservation>
            <RotameterIndex>10000006</RotameterIndex>
            <ROAddr>112233aabb06</ROAddr>
            <ROBits>500000</ROBits>
            <ROPeriod>1</ROPeriod>
            <ReportingDateTime>20041126 15:03:23.45</ReportingDateTime>
            <MonitorResolutionPeriod>60</MonitorResolutionPeriod>
        </RotameterObservation>
        <RotameterObservation> ... </RotameterObservation>
        <ReachableMac>112233aabb02</ReachableMac>
        <RotameterObservation> ... </RotameterObservation>
        <ReachableMac>112233aabb01</ReachableMac>
        <RotameterObservation> ... </RotameterObservation>
        <RotameterObservation> ... </RotameterObservation>
    </LinkReachableMacs>
    <LinkReachableMacs>
        <LinkId>WL0</LinkId>
        <MacAddress>112233aabb02</MacAddress>
        <RotameterObservation> ... </RotameterObservation>
        <ReachableMac>112233aabb05</ReachableMac>
        <RotameterObservation> ... </RotameterObservation>
        <ReachableMac>112233aabb07</ReachableMac>
        <RotameterObservation> ... </RotameterObservation>
    </LinkReachableMacs>
</DeviceReachableMacs>
```

Listing 4.

```
<DeviceReachableMacs
    xmlns="http://www.broadcom.com/schemas/QosRotameter.xsd">
    <LinkReachableMacs>
        <LinkId>eth0</LinkId>
        <BridgeId>Bridge0</BridgeId>
        <ReachableMac>112233aabb03</ReachableMac>
        <RotameterObservation>
            <RotameterIndex>10000001</RotameterIndex>
            <ROAddr>112233aabb03</ROAddr>
            <ROBits>1000000</ROBits>
            <ROPeriod>1</ROPeriod>
            <ReportingDateTime>20041126 15:03:23.45</ReportingDateTime>
            <MonitorResolutionPeriod>60</MonitorResolutionPeriod>
        </RotameterObservation>
    </LinkReachableMacs>
    <LinkReachableMacs>
        <LinkId>eth1</LinkId>
        <BridgeId>Bridge0</BridgeId>
        <ReachableMac>112233aabb07</ReachableMac>
        <RotameterObservation>
            <RotameterIndex>10000004</RotameterIndex>
            <ROAddr>112233aabb07</ROAddr>
            <ROBits>1000000</ROBits>
            <ROPeriod>1</ROPeriod>
            <ReportingDateTime>20041126 15:04:23.45</ReportingDateTime>
            <MonitorResolutionPeriod>60</MonitorResolutionPeriod>
        </RotameterObservation>
        <ReachableMac>112233aabb05</ReachableMac>
        <RotameterObservation>
            <RotameterIndex>10000007</RotameterIndex>
            <ROAddr>112233aabb05</ROAddr>
            <ROBits>1000000</ROBits>
            <ROPeriod>1</ROPeriod>
            <ReportingDateTime>20041126 15:04:43.45</ReportingDateTime>
            <MonitorResolutionPeriod>60</MonitorResolutionPeriod>
        </RotameterObservation>
    </LinkReachableMacs>
    <LinkReachableMacs>
        <LinkId>eth2</LinkId>
        <BridgeId>Bridge0</BridgeId>
        <ReachableMac>112233aabb02</ReachableMac>
        <RotameterObservation>
            <RotameterIndex>10000017</RotameterIndex>
            <ROAddr>112233aabb02</ROAddr>
            <ROBits>2300000</ROBits>
            <ROPeriod>1</ROPeriod>
            <ReportingDateTime>20041126 15:04:33.43</ReportingDateTime>
            <MonitorResolutionPeriod>60</MonitorResolutionPeriod>
        </RotameterObservation>
    </LinkReachableMacs>
    <LinkReachableMacs>
        <LinkId>eth3</LinkId>
        <BridgeId>Bridge0</BridgeId>
    </LinkReachableMacs>
</DeviceReachableMacs>
```

FIG. 3b shows an example of an implementation of a communication network comprising an Ethernet switch. Referring to FIG. 3b, the communication network 300 includes a residential gateway 395 communicatively coupled via wireless network WL0 to a media client 350 with example MAC address 112233aabb07 and a PC host 355 with example MAC address 112233aabb03, and via a wired interface to a network attached storage (NAS) 390 with example MAC address 112233aabb05. The communication network 300 also includes an Ethernet switch 365 that is communicatively coupled via wired links to the PC host 355, a PC host 360 with example MAC address 112233aabb01, a PC host 370 with example MAC address 112233aabb06, and a PC host 380 with example MAC address 112233aabb02. In an example of an implementation of the present invention, the various devices of the communication network 300 such as, for example, the PC host 355, the Ethernet switch 365, and the residential gateway 395 can act as either or both of a network rotameter observatory (NRO) and a network rotameter analysis (NRA) station.

In one example of an implementation of the invention, an argument XML string can be utilized to describe a network device such as, for example, the Ethernet switch 365. The example shown in Listing 4, below, is for a layer-2 switching device that interconnects four physical Ethernet ports. In this regard, the device supports layer-2 frame forwarding between all ports.

Figure 3D:
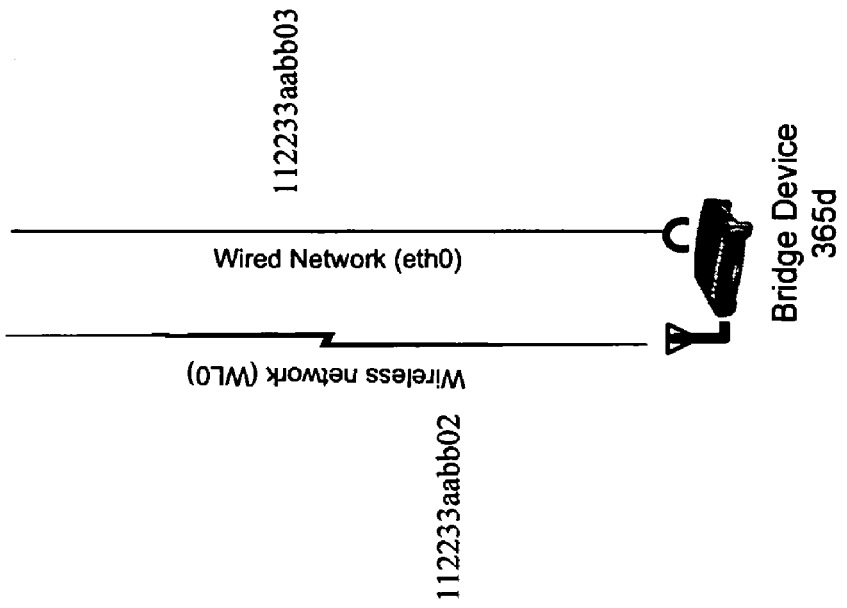
FIG. 3d shows an example of an implementation of a bridge device having a wireless network interface and a wired network interface.
Figure 3C:
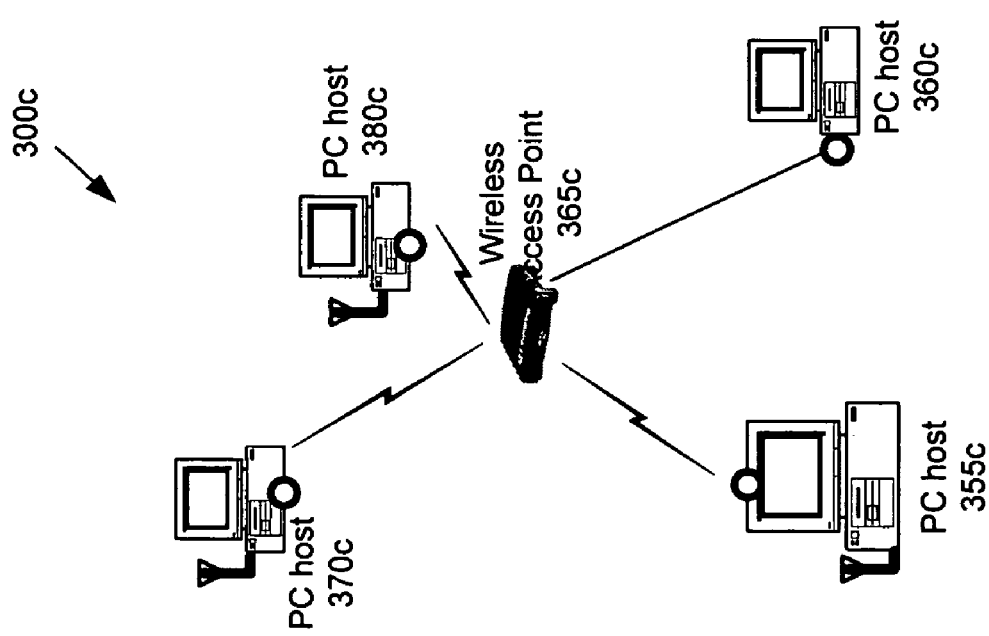
FIG. 3c shows an example of an implementation of a communication network comprising a wireless access point.

FIG. 3c shows an example of an implementation of a communication network comprising a wireless access point. Referring to FIG. 3c, the communication network 300c includes a wireless access point 365c that is communicatively coupled via a wired link to the PC host 360c, and via wireless links to PC hosts 355c, 370c, and 380c. In an example of an implementation of the present invention, the various devices of the communication network 300c such as, for example, the PC hosts 355c, 370c, 380c, and 360c, or the wireless access point 365c can act as either or both of a network rotameter observatory (NRO) and a network rotameter analysis (NRA) station.

In one example of an implementation of the invention, an argument XML string is utilized to describe a network device such as, for example, a wireless access point (AP) with an Ethernet interface. The example shown in Listing 5, below, is for a wireless access point with three associated wireless stations and a single Ethernet port, such as the wireless access point 365c. The device 365c supports layer-2 frame forwarding between all links, that includes forwarding (bridging) between wireless stations or to the Ethernet interface.

Listing 5.

```
<DeviceReachableMacs
xmlns="http://www.broadcom.com/schemas/QosRotameter.xsd">
    <LinkReachableMacs>
        <LinkId>WL0</LinkId>
        <BridgeId>Bridge0</BridgeId>
        <ReachableMac>112233aabb02</ReachableMac>
        <RotameterObservation>
            <RotameterIndex>10001001</RotameterIndex>
            <ROAddr>112233aabb02</ROAddr>
            <ROBits>2000000</ROBits>
            <ROPeriod>1</ROPeriod>
            <ReportingDateTime>20041126
15:04:43.45</ReportingDateTime>
            <MonitorResolutionPeriod>60</MonitorResolutionPeriod>
        </RotameterObservation>
        <ReachableMac>112233aabb01</ReachableMac>
        <RotameterObservation>
            <RotameterIndex>10001002</RotameterIndex>
            <ROAddr>112233aabb01</ROAddr>
            <ROBits>2300000</ROBits>
            <ROPeriod>1</ROPeriod>
            <ReportingDateTime>20041126
15:04:33.43</ReportingDateTime>
            <MonitorResolutionPeriod>60</MonitorResolutionPeriod>
        </RotameterObservation>
        <ReachableMac>112233aabb09</ReachableMac>
        <RotameterObservation>
            <RotameterIndex>10001003</RotameterIndex>
            <ROAddr>112233aabb09</ROAddr>
            <ROBits>5800000</ROBits>
            <ROPeriod>1</ROPeriod>
            <ReportingDateTime>20041126
15:04:34.23</ReportingDateTime>
            <MonitorResolutionPeriod>60</MonitorResolutionPeriod>
        </RotameterObservation>
    </LinkReachableMacs>
    <LinkReachableMacs>
        <LinkId>eth0</LinkId>
        <BridgeId>Bridge0</BridgeId>
        <ReachableMac>112233aabb03</ReachableMac>
        <RotameterObservation>
            <RotameterIndex>10001004</RotameterIndex>
            <ROAddr>112233aabb03</ROAddr>
            <ROBits>5800000</ROBits>
            <ROPeriod>1</ROPeriod>
            <ReportingDateTime>20041126
15:03:34.23</ReportingDateTime>
            <MonitorResolutionPeriod>60</MonitorResolutionPeriod>
        </RotameterObservation>
        <ReachableMac>112233aabb07</ReachableMac>
        <RotameterObservation>
            <RotameterIndex>10001005</RotameterIndex>
            <ROAddr>112233aabb07</ROAddr>
            <ROBits>3700000</ROBits>
            <ROPeriod>1</ROPeriod>
            <ReportingDateTime>20041126
15:04:34.26</ReportingDateTime>
            <MonitorResolutionPeriod>60</MonitorResolutionPeriod>
        </RotameterObservation>
        <ReachableMac>112233aabb05</ReachableMac>
        <RotameterObservation>
            <RotameterIndex>10001006</RotameterIndex>
            <ROAddr>112233aabb05</ROAddr>
            <ROBits>6200000</ROBits>
            <ROPeriod>1</ROPeriod>
            <ReportingDateTime>20041126
```

-continued

Listing 5.

```
15:04:31.42</ReportingDateTime>
            <MonitorResolutionPeriod>60</MonitorResolutionPeriod>
        </RotameterObservation>
    </LinkReachableMacs>
</DeviceReachableMacs>
```

FIG. 3d shows an example of an implementation of a bridge device having a wireless network interface and a wired network interface. Referring to FIG. 3d, the wireless network interface of the bridge device 365d has an example MAC address 112233aabb02 to a wireless network labeled WL0. The wired network interface of the bridge device 365d has an example MAC address 112233aabb03 to a wired network labeled eth0. In one example of an implementation of the invention, the bridge device 365d can act as either or both of a network rotameter observatory (NRO) station and a network rotameter analysis (NRA) station.

In another example of an implementation of the invention, an argument XML string can be utilized to describe a network device such as, for example, a bridge device between a wireless station, and an Ethernet wireless access point (AP) with an Ethernet interface. The example of an implementation of a argument XML string shown in Listing 6, below, can correspond to, for example, a bridging device with two interfaces on different network technologies, such as the bridge device 365d. The bridging device 365d of Listing 2 does layer-2 forwarding of frames between wireless station interface and the wired Ethernet interface.

Listing 6

```
<DeviceReachableMacs
xmlns="http://www.broadcom.com/schemas/QosRotameter.xsd">
    <LinkReachableMacs>
        <LinkId>WL0</LinkId>
        <BridgeId>Bridge0</BridgeId>
        <ReachableMac>112233aabb03</ReachableMac>
        <RotameterObservation>
            <RotameterIndex>10001004</RotameterIndex>
            <ROAddr>112233aabb03</ROAddr>
            <ROBits>5800000</ROBits>
            <ROPeriod>1</ROPeriod>
            <ReportingDateTime>20041126
15:03:34.23</ReportingDateTime>
            <MonitorResolutionPeriod>60</MonitorResolutionPeriod>
        </RotameterObservation>
    </LinkReachableMacs>
    <LinkReachableMacs>
        <LinkId>eth0</LinkId>
        <BridgeId>Bridge0</BridgeId>
        <ReachableMac>112233aabb07</ReachableMac>
        <RotameterObservation>
            <RotameterIndex>10001005</RotameterIndex>
            <ROAddr>112233aabb07</ROAddr>
            <ROBits>3700000</ROBits>
            <ROPeriod>1</ROPeriod>
            <ReportingDateTime>20041126
15:04:34.26</ReportingDateTime>
            <MonitorResolutionPeriod>60</MonitorResolutionPeriod>
        </RotameterObservation>
    </LinkReachableMacs>
</DeviceReachableMacs >
```

In an example of an implementation of the invention, a NRO station and/or a NRA station can support a plurality of actions, as described above. For example, an action call that can be named GetNeighborInformation can return the NeighborInformation structure for a QoS rotameter observation service that can provide information about reachable media access control (MAC) addresses. This information can be used by the network rotameter analysis (NRA) service or an (independent) application. The action call can have as an input argument the number of descriptions per address, and can produce as output, the NeighborInformation information structure described previously herein. An example of an implementation of the present invention can also support an action call named ConfigureRotameterObservation that can have as input arguments, a reporting period and a monitoring resolution. The reporting period defines the duration of observation in seconds and the monitoring resolution defines the time interval between measurements.

A network rotameter analysis (NRA) station can also support eventing. In this regard, communication network conditions in excess of traffic thresholds can trigger the reporting of an event. An NRA or an (independent) application can further collect reports from various NRO services, and can provide summarized output. The contents of an information structure such as the information structure NeighborInformation described above can be monitored, and events can be triggered based upon the information elements or fields being tracked. Furthermore, a device that can be acting as a quality of service (QoS) device can collect information about network flows from its interfaces.

In addition, a network rotameter analysis (NRA) station can function to produce output in a variety of forms. For example, a NRA station can produce an output as a network rotameter (flow/weather) map, a display of time of day traffic, and/or a display of segment traffic. The network rotameter map can be represented as a graphical image. The display of time of day traffic can be represented in tabular or graph form and a display of segment traffic can be represented in tabular or graph form. Output information can be ordered by severity in the analysis output, and/or the output information can be ordered by proximity, for example the proximity to the requester, showing concerns closest to the neighborhood of a network device an d/or the output information can be ordered by time.

A network rotameter analysis (NRA) station can support a number of requests for action from devices of the communication network. For example, a NRA station can provide support for a request for network traffic information in the form of an action call GetWeatherMap. This action call can return a network weather image based on an analysis of the latest reports of QoS rotameter observation services. Such an action call may include arguments including, for example, an AnalysisTime argument, a Location argument, and/or a Format argument. If the AnalysisTime is the current time, the NRA can immediately query one or more NRO using GetNeighborInformation to get the most up-to-date information. If the AnalysisTime is prior to the current time, the NRA can use stored data to construct an output. Alternatively, an NRO can have stored information, and the NRO can also be queried. If the AnalysisTime is in the future, the NRA can use stored data to predict and construct an output. The Location argument can be used to indicate the "center" of the report.

In an example of an implementation of the invention, the NRA station can be adapted to analyze past events as well as current events. The NRA can then predict and construct an output based on the analyzed past events and/or current events. A NRA station can also provide support for a request to set system thresholds in the form of an action call named SetWeatherThresholds. The SetWeatherThresholds action call is used to set thresholds in order to determine when communication system traffic or throughputs should trigger an event. Such an action call may includes arguments, for example, a Location argument, a Bits argument, and/or a Duration argument.

Figure 4:
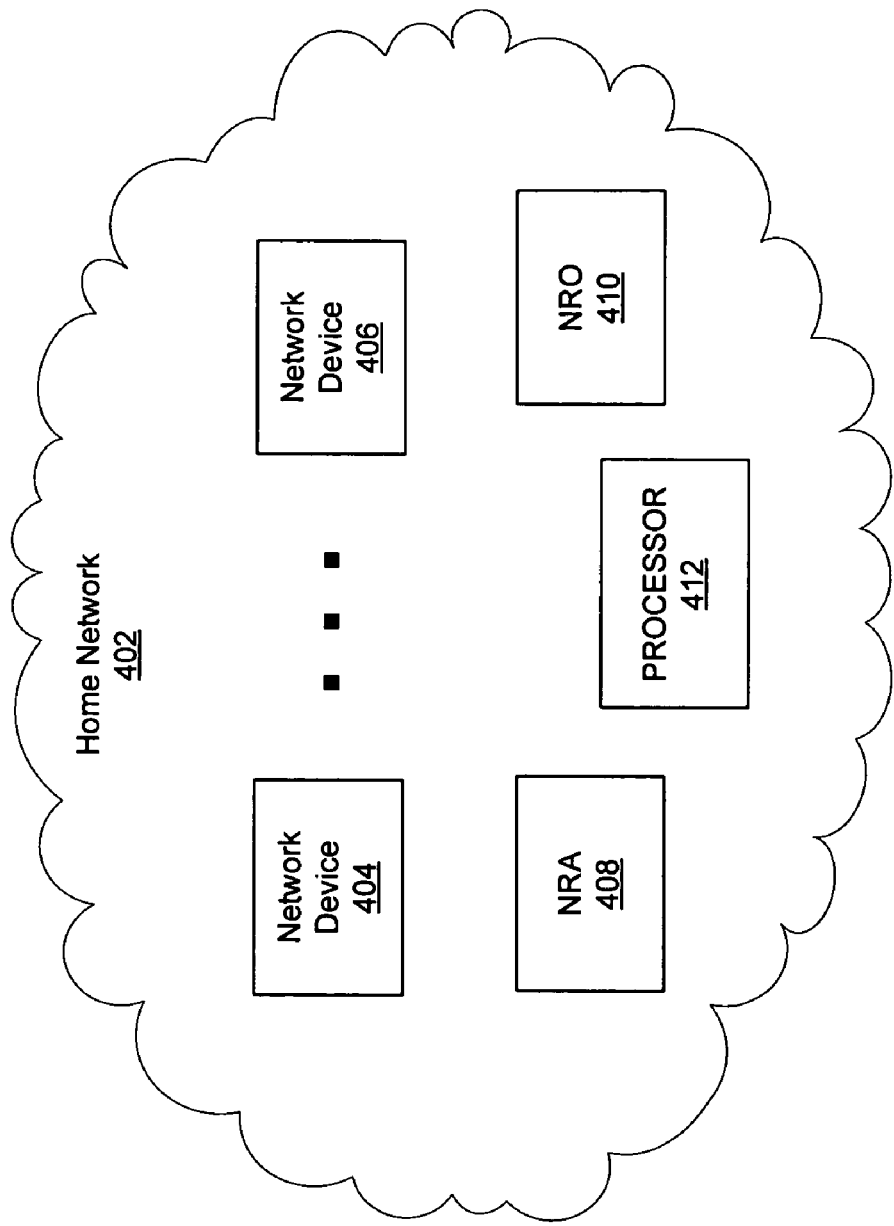
FIG. 4 shows an example of an implementation of a system for controlling network traffic in a network.

FIG. 4 shows an example of an implementation of a system for controlling network traffic in a network. Referring to FIG. 4, the home network 402 includes a plurality of network devices 404, . . . , 406, a network rotameter observation (NRO) station 410, a network rotameter analysis (NRA) station 408, and a processor 412. The NRO station 410 monitors network traffic characteristics for a plurality of communication channels in the home network. The NRA station estimates network traffic for at least a portion of the plurality of communication channels for the plurality of network devices 404, . . . , 406 in the home network 402. The estimated network traffic can be a past network traffic estimate, a current network traffic estimate, or a future network traffic estimate. The processor 412 can re-route current network traffic for at least a portion of the plurality of communication channels for the devices 404, . . . , 406 in the home network 402, based on the estimated network traffic. Although the processor 412 is illustrated as a separate entity, the invention is not so limited. Accordingly, the processor 412 can be integrated within the network rotameter observation (NRO) station 410, the network rotameter analysis (NRA) station 408 and/or at least one of the plurality of network devices 404, . . . , 406.

The NRA station 408 can receive at least one request for an action call from a requesting device from the devices 404, . . . , 406 within the home network 402. In response to the at least one request for an action call, the NRA station 408 can analyze weather information based on most current reports from the NRO station 410. The NRA station 408 can generate a current report based on the analyzing. The NRA station 408 can communicate the generated current report to at least the requesting device selected from the devices 404, . . . , 406 within the home network 402. The generated current report may include one or more of: a network rotameter (flow/weather) map, a display of time of day traffic, and a display of segment traffic. The NRA station 408 can determine whether network conditions within the home network 402 are in excess of at least one traffic threshold.

If the network conditions exceed the at least one traffic threshold, the NRA station 408, or the NRO station 410, can generate a reporting event. The network traffic characteristics may include one or more of: a link identifier (linkId) information element, a MAC address (MacAddress) information element, a reachable MAC (ReachableMac) information element, a bridge identifier (BridgedId) information element, and a rotameter index (RotameterIndex) information element. In addition, the network traffic characteristics may include one or more of: a rotameter address (ROAddress) information element, a rotameter (ROBits) information element, a rotameter period (ROPeriod) information element, a reporting date and time (ReportingDateTime) information element, and a monitor resolution period (MonitorResolutionPeriod) information element.

In an example of an implementation of the invention, the NRA station 408 can be adapted to analyze past events as well as current events. The NRA station 408 can then predict and construct an output based on the analyzed past events and/or current events. In another example of an implementation of the invention, the home network 402 may include an NRO station 410 and no NRA stations. In this regard, the NRO station 410 can communicate observations of past and/or current traffic conditions to one or more network applications. The network applications can then make their own traffic-related determinations, based on the communicated past or current traffic observations.

Figure 5:
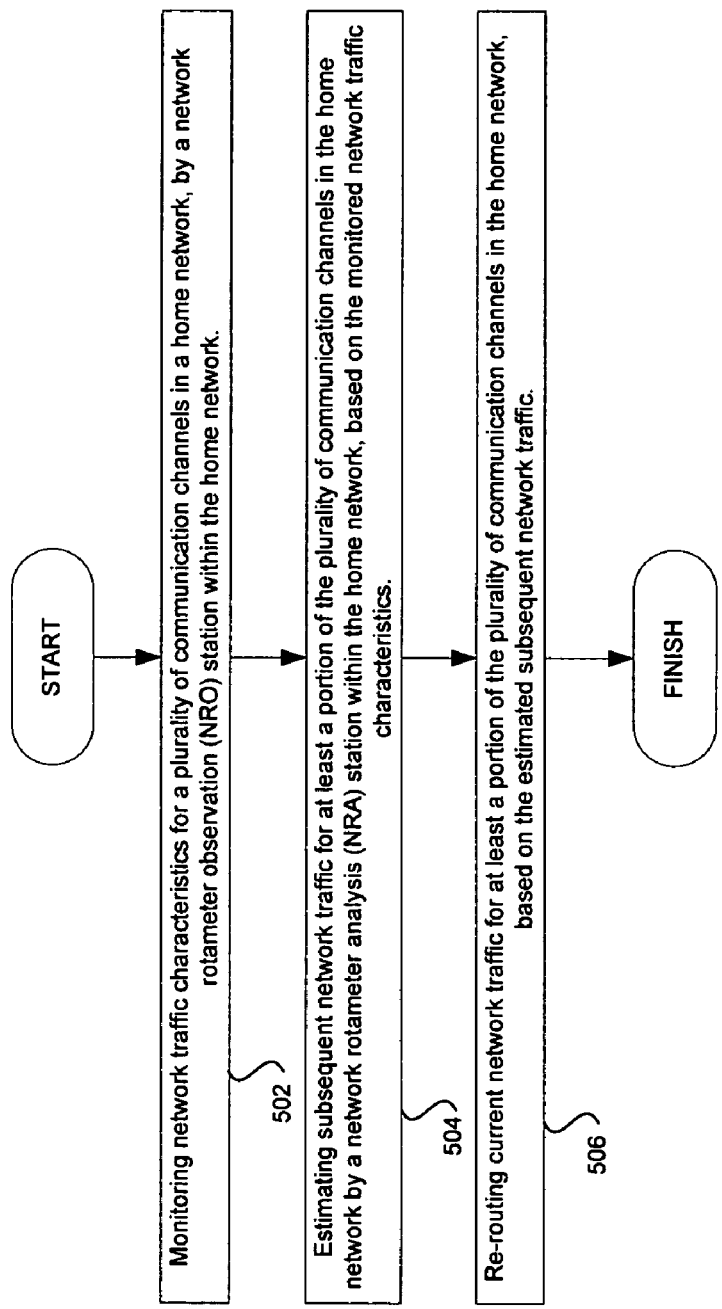
FIG. 5 is a flow diagram illustrating an example of an implementation of steps for controlling network traffic in a network.

FIG. 5 is a flow diagram showing an example of an implementation of steps for controlling network traffic in a network. Referring to FIGS. 4 and 5, at 502, network traffic characteristics can be monitored for a plurality of communication channels for a plurality of network devices 404, . . . , 406 in a home network 402. The network traffic characteristics can be monitored by a network rotameter observation (NRO) station 410 within the home network 402. At 504, network traffic can be estimated for at least a portion of the plurality of communication channels for one or more of the plurality of devices 404, . . . , 406 in the home network 402. The network traffic can be estimated by a network rotameter analysis (NRA) station 408 within the home network 402, based on the monitored network traffic characteristics. At 506, current network traffic can be re-routed for at least a portion of the plurality of communication channels for the network devices 404, . . . , 406 in the home network 402. The current network traffic can be re-routed by the processor 412, based on the estimated network traffic within the home network 402.

In one aspect of the invention, a machine-readable storage can be provided, having stored thereon, a computer program having at least one code section for monitoring network traffic in a network, the at least one code section being executable by a machine for causing the machine to perform steps comprising monitoring network traffic characteristics for a plurality of communication channels in a home network, by at least one processor within the home network. The at least one processor can re-route current network traffic for at least a portion of the plurality of communication channels in the home network, based on analysis by the at least one processor of at least the monitored network traffic characteristics. Network traffic can be estimated for at least a portion of the plurality of communication channels in the home network by the at least one processor within the home network, based on the monitored network traffic characteristics.

The at least one processor can re-route the current network traffic for at least a portion of the plurality of communication channels in the home network, based on the estimated network traffic. The network traffic characteristics may include at least one of: past network traffic characteristics and current network traffic characteristics. The at least one processor may include a first processor and a second processor. The first processor may include a network rotameter observation (NRO) station that performs the monitoring, and the second processor may include a network rotameter analysis (NRA) station that performs the estimating. The at least one processor may include at least one third processor that performs the re-routing. At least one request for an action call from a requesting device within the home network can be received at the NRA station. Network weather information can be analyzed based on most current reports from at least the NRO station, in response to the at least one request for an action call.

A current report can be generated based on the analyzing, and the generated current report can be communicated to at least the requesting device within the home network. The generated current report may include at least one of: a network rotameter map, a display of time of day traffic, and a display of segment traffic. The NRA station can determine whether network conditions within the home network are in excess of at least one traffic threshold. A reporting event can be generated by the NRA station, if the network conditions exceed the at least one traffic threshold. The network traffic characteristics may include at least one of: a link identifier (linkId) information element, a MAC address (MacAddress) information element, a reachable MAC (ReachableMac) information element, a bridge identifier (BridgedId) information element, and a rotameter index (RotameterIndex) information element. The network traffic characteristics also may include at least one of: a rotameter address (ROAddress) information element, a rotameter (ROBits) information element, a rotameter period (ROPeriod) information element, a reporting date and time (ReportingDateTime) information element, a traffic class (TrafficClass) information element, and a monitor resolution period (MonitorResolutionPeriod) information element.

In an example of an implementation of the invention, a method for organizing network traffic in a network may comprise monitoring network traffic characteristics of a plurality of communication channels in a home network, by at least one processor within the home network. A particular one of the plurality of communication channels may be selected for use in the home network, based on analysis of at least the monitored network traffic characteristics for the home network. The network traffic characteristics may comprise a link identifier (linkId) information element, a MAC address (MacAddress) information element, a reachable MAC (ReachableMac) information element, a bridge identifier (BridgedId) information element, and/or a rotameter index (RotameterIndex) information element. The network traffic characteristics may also comprise a rotameter address (ROAddress) information element, a rotameter (ROBits) information element, a rotameter period (ROPeriod) information element, a reporting date and time (ReportingDateTime) information element, a traffic class (TrafficClass) information element, and/or a monitor resolution period (MonitorResolution Period) information element.

The network traffic characteristics may comprise past network traffic characteristics and/or current network traffic characteristics. The monitoring may be performed via a network rotameter observation (NRO) station. Network traffic for at least a portion of the plurality of communication channels in the home network may be estimated based on the monitored network traffic characteristics. The current network traffic for at least a portion of the plurality of communication channels may be re-routed in the home network based on the estimated network traffic. The estimating may be performed by a network rotameter analysis (NRA) station and/or an application desiring network services. The NRA station may determine whether network conditions within the home network are in excess of at least one traffic threshold, and if the network conditions exceed the at least one traffic threshold, a reporting event may be generated by the NRA station. At least one request for an action call may be received at the NRA station from a requesting device within the home network. In response to the at least one request for an action call, network weather information may be analyzed based on most current reports from at least an NRO station.

A current report may be generated based on the analyzing, and the generated current report may be communicated to at least the requesting device within the home network. The generated current report may comprise a network rotameter map, a display of time of day traffic, and/or a display of segment traffic. The selecting and the analysis of at least the monitored network traffic characteristics may be performed via at least one processor and/or at least one user. The at least one processor may respond to input provided by a user for the enabling of the selection of the particular one of the plurality of communication channels for use in the home network. The at least one processor may respond to a signal provided by a user input device for the enabling of the selection of the particular one of the plurality of communication channels for use in the home network.

Accordingly, the present invention can be realized in hardware, software, or a combination of hardware and software. The present invention can be realized in a centralized fashion in at least one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention can also be embedded in a computer program product, that includes all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes can be made and equivalents can be substituted without departing from the scope of the present invention. In addition, many modifications can be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communication, the method comprising: in a home network comprising a plurality of communication devices, each of said plurality of communication device comprises a plurality of processors, wherein said plurality of processors collaborate to perform functions comprising:
   using a first plurality of said processors in a first communication device for monitoring said plurality of communication devices, network traffic characteristics of a plurality of communication channels in said home network, wherein at least a second communication device of said plurality of communication devices is also operable to monitor said network traffic characteristics of one or more of said plurality of channels in said home network; and
   using a second plurality of said processors in said first communication device for re-routing network traffic for at least a portion of said plurality of communication channels in said home network, based on analysis, of at least said monitored network traffic characteristics, by said first communication device and said at least said second communication device within said home network, for said at least a portion of said plurality of communication channels based on said analysis.

2. The method according to claim 1, comprising estimating network traffic for at least a portion of said plurality of communication channels in said home network using a third plurality of said processors in said first communication device, based on said monitored network traffic characteristics.

3. The method according to claim 2, comprising re-routing, using said second plurality of said processors in said first communication device, said current network traffic for at least a portion of said plurality of communication channels in said home network, based on said estimated network traffic.

4. The method according to claim 1, wherein said network traffic characteristics comprise at least one of the following: past network traffic characteristics and current network traffic characteristics.

5. The method according to claim 2, wherein said first plurality of said processors comprises a network rotameter observation (NRO) station that performs said monitoring, and wherein said third plurality of said processors comprises at least one of the following: a network rotameter analysis (NRA) station that performs said estimating and an application desiring network services that performs said estimating.

6. The method according to claim 5, comprising, analyzing network weather information based on most current reports from at least said NRO station.

7. The method according to claim 5, comprising receiving at said NRA station, at least one request for an action call from a requesting device within said home network.

8. The method according to claim 7, comprising, in response to said at least one request for an action call, using one of said plurality of said processors for analyzing network weather information based on most current reports from at least said NRO station.

9. The method according to claim 7, comprising generating a current report based on said analyzing; and communicating said generated current report to at least said requesting device within said home network.

10. The method according to claim 9, wherein said generated current report comprises at least one of the following: a network rotameter map, a display of time of day traffic, and a display of segment traffic.

11. The method according to claim 5, comprising determining by said NRA station, whether network conditions within said home network are in excess of at least one traffic threshold, and if said network conditions exceed said at least one traffic threshold, generating a reporting event by said NRA station.

12. The method according to claim 1, wherein said network traffic characteristics comprise at least one of the following: a link identifier (linkId) information element, a MAC address (MacAddress) information element, a reachable MAC (ReachableMac) information element, a bridge identifier (BridgedId) information element, and a rotameter index (RotameterIndex) information element.

13. The method according to claim 1, wherein said network traffic characteristics comprise at least one of the following: a rotameter address (ROAddress) information element, a rotameter (ROBits) information element, a rotameter period (ROPeriod) information element, a reporting date and time (ReportingDateTime) information element, a traffic class (TrafficClass) information element, and a monitor resolution period (MonitorResolutionPeriod) information element.

14. A system for communication, the system comprising: in a home network comprising a plurality of communication devices, each of said plurality of communication device comprises a plurality of processors, wherein said plurality of processors collaborate to perform functions, wherein:
   a first plurality of said processors in a first communication device of said plurality of communication devices monitors network traffic characteristics of a plurality of communication channels in said home network, wherein at least a second communication device of said plurality of communication devices is also operable to monitor said network traffic characteristics of one or more of said plurality of channels in said home network; and
   a second plurality of said processors in said first communication device re-routes network traffic for at least a portion of said plurality of communication channels in said home network, based on analysis, of at least said monitored network traffic characteristics, by said first communication device and said at least said second communication device within said home network, for said at least a portion of said plurality of communication channels based on said analysis.

15. The system according to claim 14, wherein a third plurality of said processors in said first communication device enables estimation of network traffic for at least a portion of said plurality of communication channels in said home network, based on said monitored network traffic characteristics.

16. The system according to claim 15, wherein said second plurality of said processors in said first communication device enables re-routing of said current network traffic for at least a portion of said plurality of communication channels in said home network, based on said estimated network traffic.

17. The system according to claim 14, wherein said network traffic characteristics comprise at least one of the following: past network traffic characteristics and current network traffic characteristics.

18. The system according to claim 15, wherein said first plurality of said processors comprises a network rotameter observation (NRO) station that performs said monitoring, and wherein said third plurality of said processors comprises at least one of the following: a network rotameter analysis (NRA) station that performs said estimating and an application desiring network services that performs said estimating.

19. The system according to claim 18, comprising, analyzing network weather information based on most current reports from at least said NRO station.

20. The system according to claim 18, wherein said first communication device enables receiving at said NRA station of at least one request for an action call from a requesting device within said home network.

21. The system according to claim 20, wherein, in response to said at least one request for an action call, one of said plurality of said processors for said first communication device enables analyzing of network weather information based on most current reports from at least said NRO station.

22. The system according to claim 20, wherein said first communication device enables generation of a current report based on said analyzing, and wherein said first communication device enables communication of said generated current report to at least said requesting device within said home network.

23. The system according to claim 22, wherein said generated current report comprises at least one of the following: a network rotameter map, a display of time of day traffic, and a display of segment traffic.

24. The system according to claim 18, wherein said first communication device enables determining by said NRA station, whether network conditions within said home network are in excess of at least one traffic threshold, and wherein said first communication device enables generation of a reporting event by said NRA station, if said network conditions exceed said at least one traffic threshold.

25. The system according to claim 14, wherein said network traffic characteristics comprise at least one of the following: a link identifier (linkId) information element, a MAC address (MacAddress) information element, a reachable MAC (ReachableMac) information element, a bridge identifier (BridgedId) information element, and a rotameter index (RotameterIndex) information element.

26. The system according to claim 14, wherein said network traffic characteristics comprise at least one of the following: a rotameter address (ROAddress) information element, a rotameter (ROBits) information element, a rotameter period (ROPeriod) information element, a reporting date and time (ReportingDateTime) information element, a traffic class (TrafficClass) information element, and a monitor resolution period (MonitorResolutionPeriod) information element.

27. A method for organizing network traffic in a network, the method comprising:
in a home network comprising a plurality of communication devices, each of said plurality of communication device comprises a plurality of processors, wherein said plurality of processors collaborate to perform functions comprising:
using a first plurality of said processors in a first communication device for monitoring said plurality of communication devices, network traffic characteristics of a plurality of communication channels in said home network, wherein at least a second communication device of said plurality of communication devices is also operable to monitor said network traffic characteristics of one or more of said plurality of channels in said home network; and
using a second plurality of said processors in said first communication device for selecting a particular one of said plurality of communication channels for use in said home network, based on analysis of at least said monitored network traffic characteristics, by said first communication device and said at least said second communication device within said home network, for said at least a portion of said plurality of communication channels based on said analysis.

28. The method according to claim 27, wherein said selecting and said analysis of at least said monitored network traffic characteristics is done via at least one of the following: said first communication device and at least one user.

29. The method according to claim 28, wherein said network traffic characteristics comprise at least one of the following: a link identifier (linkId) information element, a MAC address (MacAddress) information element, a reachable MAC (ReachableMac) information element, a bridge identifier (BridgedId) information element, and a rotameter index (RotameterIndex) information element.

30. The method according to claim 28, wherein said network traffic characteristics comprise at least one of the following: a rotameter address (ROAddress) information element, a rotameter (ROBits) information element, a rotameter period (ROPeriod) information element, a reporting date and time (ReportingDateTime) information element, a traffic class (TrafficClass) information element, and a monitor resolution period (MonitorResolutionPeriod) information element.

31. The method according to claim 28, wherein said network traffic characteristics comprise at least one of the following: past network traffic characteristics and current network traffic characteristics.

32. The method according to claim 28, comprising performing said monitoring via a network rotameter observation (NRO) station.

33. The method according to claim 28, comprising using a third plurality of said processors in said first communication device for estimating network traffic for at least a portion of said plurality of communication channels in said home network based on said monitored network traffic characteristics.

34. The method according to claim 33, comprising using said second plurality of said processors in said first communication device for re-routing said current network traffic for at least a portion of said plurality of communication channels in said home network based on said estimated network traffic.

35. A system for organizing network traffic in a network, the system comprising:
in a home network comprising a plurality of communication devices, each of said plurality of communication device comprises a plurality of processors, wherein said plurality of processors collaborate to perform functions, wherein:
a first plurality of said processors in a first communication device of said plurality of communication devices monitors network traffic characteristics of a plurality of communication channels in a home network, wherein at least a second communication device of said plurality of communication devices is also operable to monitor said network traffic characteristics of one or more of said plurality of channels in said home network; and
a second plurality of said processors in said first communication device selects a particular one of said plurality of communication channels for use in said home network, based on analysis of at least said monitored network traffic characteristics, by said first communication device and said at least said second communication device within said home network, for said at least a portion of said plurality of communication channels based on said analysis.

36. The system according to claim 35, wherein at least one of the following: said first communication device and at least one user enable said selecting and said analysis of said at least said monitored network traffic characteristics.

37. The system according to claim 36, wherein said network traffic characteristics comprise at least one of the following: a link identifier (linkId) information element, a MAC address (MacAddress) information element, a reachable MAC (ReachableMac) information element, a bridge identifier (BridgedId) information element, and a rotameter index (RotameterIndex) information element.

38. The system according to claim 36, wherein said network traffic characteristics comprise at least one of the following: a rotameter address (ROAddress) information element, a rotameter (ROBits) information element, a rotameter period (ROPeriod) information element, a reporting date and time (ReportingDateTime) information element, a traffic class (TrafficClass) information element, and a monitor resolution period (MonitorResolutionPeriod) information element.

39. The system according to claim 36, wherein said network traffic characteristics comprise at least one of the following: past network traffic characteristics and current network traffic characteristics.

40. The system according to claim 36, comprising a network rotameter observation (NRO) station that enables performance of said monitoring.

41. The system according to claim 36, wherein a third plurality of said processors in said first communication device enables estimation of network traffic for at least a portion of said plurality of communication channels in said home network based on said monitored network traffic characteristics.

42. The system according to claim 36, wherein said second plurality of said processors in said first communication device enables re-routing said current network traffic for at least a portion of said plurality of communication channels in said home network based on said estimated network traffic.

43. The system according to claim 35, wherein said first communication device responds to input provided by a user for said enabling of said selection of said particular one of said plurality of communication channels for use in said home network.

44. The system according to claim 35, wherein said first communication device responds to a signal provided by a user input device for said enabling of said selection of said particular one of said plurality of communication channels for use in said home network.

* * * * *